United States Patent Office 3,723,153
Patented Mar. 27, 1973

3,723,153
PROCESS FOR THE PRODUCTION OF A POWDERY COLORING AGENT AND PELLETS OF POLYALKYLENE RESIN COVERED THEREWITH
Yoshiaki Nagata, Suita, Yatuhiro Higo, Settsu, Satoshi Hirabayashi, Hyoto, and Eiichi Morozumi, Ibaragi, Japan, assignors to Dainippon Ink and Chemicals, Incorporated, Tokyo, Japan
Continuation of abandoned application Ser. No. 844,146, July 23, 1969. This application Nov. 20, 1970, Ser. No. 91,554
Claims priority, application Japan, July 24, 1968, 43/51,835; July 31, 1968, 43/53,609
Int. Cl. B44d 1/94
U.S. Cl. 117—21                   1 Claim

ABSTRACT OF THE DISCLOSURE

A coloring agent for a polyalkylene is obtained by uniformly mixing an antistatic agent with a mixture of a low molecular weight polyalkylene and a pigment. When said coloring agent is blended with pellets of a polyalkylene, the surfaces of the pellets are uniformly covered with said coloring agent and colored pellets of a polyalkylene are obtained.

---

This application is a continuation of application Ser. No. 844,146, filed July 23, 1969, now abandoned.

The present invention relates to a coloring agent for coloring a thermoplastic resin and thermoplastic resin pellets colored by said coloring agent and to a technique for preparing a thermoplastic resin shaped article colored by said coloring agent.

Heretofore, in the preparation of colored fiber, film or plastic shaped articles from a thermoplastic resin such as polyalkylene resin, a process of melting a thermoplastic resin with a coloring agent to make concentrated colored pellets, mixing said pellets with uncolored pellets and shaping the mixture or a process of shaping a mixture of uncolored pellets directly with powdery coloring agent has been adopted.

A coloring agent used for such a process is prepared by mixing several kinds of pigment in order to meet the demand of the user. However, in said conventional process much labor and expense have been spent in order to make the color tone in accord with what is demanded. Namely, in a process of melting a coloring agent with a thermoplastic resin, whenever a coloring agent is prepared, heating and melting must be repeated, and in addition, a troublesome operation such as cleaning of the kneading machine must be performed each time. Also, in a process of directly blending a powdery coloring agent with uncolored pellets, the coloring agent easily agglomerates to form crude particles, and as a result it is impossible to mix them completely uniformly, and even if the coloring agent does not agglomerate, adhering to resin pellets is insufficient and it is almost impossible to precisely make a color tone in accord with what is demanded.

The new powdery coloring agent of the present invention can be mixed into uniform coloring agent by merely mixing more than two kinds of coloring agent. Therefore, by merely blending the coloring agents so prepared in a certain color tone with pellets of a polyalkylene resin, it is possible to make the pellets of the polyalkylene resin colored in the demanded color tone.

An object of the present invention is to color a polyalkylene easily. Another object of the present invention is to provide a coloring agent for easily coloring a polyalkylene.

According to the present invention, a powdery coloring agent obtained by mixing an antistatic agent with a colored powder obtained by kneading a pigment with a low molecular weight polyalkylene and pulverizing the kneaded matter, can easily color pellets of a polyalkylene resin by blending with pellets of a polyalkylene resin. The pellets of polyalkylene resin so colored by the present invention, alone or in admixture with uncolored pellets, are shaped into any colored shaped article.

The accompanying drawings are graphs for proving uniformity of mixed state in the case of mixing two kinds of powdery coloring agent.

Figure 1:
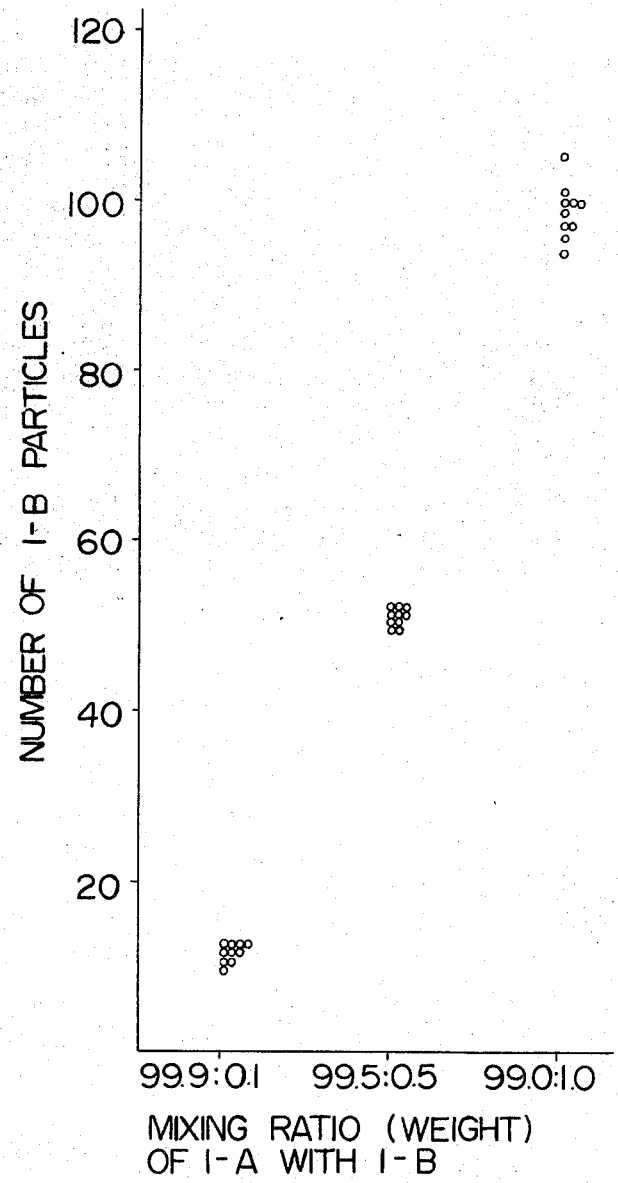
Figure 2:
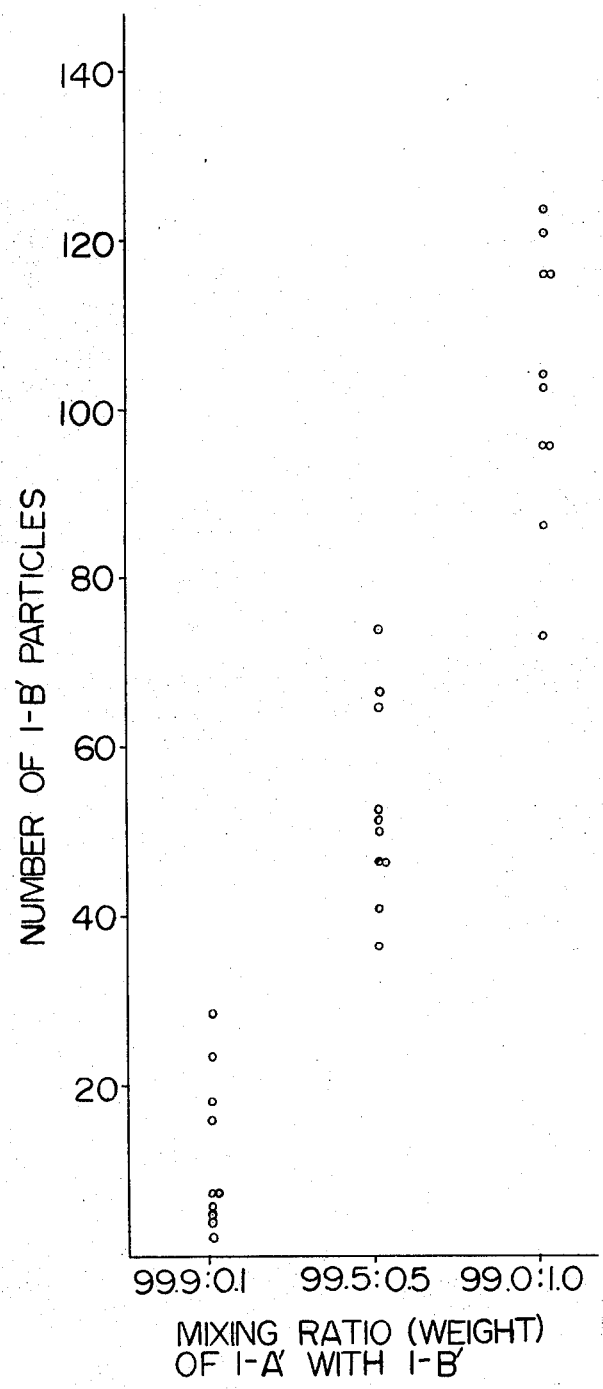

FIG. 1 is a graph showing mixed state of the powdery coloring agent of the present invention, whereas FIG. 2 is a graph showing mixed state of the powdery coloring agent of the conventional process.

As the low molecular weight polyalkylene usable in the present invention those hitherto used as a coloring agent for polyalkylene such as polyethylene polypropylene and polybutene having a molecular weight of about 1,000–15,000 may be used. Specifically products in powder or pellet such as AC Polyethylene (manufactured by Allied Chemical Corporation of U.S.A.), Wax BASF (manufactured by Badische Anilin und Soda Fabrik of Germany), Hoechst wax (manufactured by Hoechst of Germany) and Epolen (manufactured by Eastman Kodak Co. of U.S.A.) may be cited.

As an antistatic agent usable in the invention, those hitherto used as an antistatic agent for plastics such as alkyl sulfate-type, alkylaryl sulfate-type, alkylamine sulfate-type, alkyl phosphate-type, imidazoline-type, a quaternary ammonium salt of fatty acid-type, ethanolamide-type, polyoxyethylenealkyl-amine or -amide-type, sorbitan-type, polyoxyethylenealkylarylether-type, fatty acid glyceride-type and betaine-type may be used.

As such antistatic agents, there are polyoxyethylene-laurylether sulfuric acid ester salt, polyoxyethylene-1-nyl-phenolether sulfuric acid ester salt, amine salt of stearic acid, polyoxyethylenestearylamide, poly-oxypropylene-laurylamide, trimethylcetylammonium chloride, dilauryl-dimethylammonium chloride, 1-hydroxyethyl-2-alkylimidazoline, bistriazinylaminobibenzyl, sorbitan oleate, sorbitan laurate, monoglyceride or diglyceride of stearic acid, polyoxyethylene stearylester and polyoxyethylene-sorbitan stearate, and it is recognized that each of them achieves the similar effect. Such antistatic agents are used in an optional form such as powder or a volatil-solvent solution.

It is preferable that the ratio of the low molecular weight polyalkylene to the pigment in the coloring agent composition of the present invention should be 100 parts (by weight: hereinafter part expresses part by weight) to 10–230 parts. The ratio of the antistatic agent used varies considerably depending upon the respective agent; however, normally 0.1–6 parts, based on 100 parts of the total weight of the pigment and the low molecular weight polyalkylene is suitable. When the amount of the antistatic agent is too large, wettability of the coloring agent composition increases or it becomes a cause of deterioration of a matter to be colored.

The aforesaid three components are the essential constituents of the coloring agent of the present invention. The effects of the invention can however be retained even if the coloring agent contains minor amounts of dispersing agents, stabilizers or low-boiling solvents in addition to these essential components.

The coloring agent composition of the present invention is obtained by first sufficiently mixing a pigment and a low molecular weight polyalkylene using a gate mixer, a pony mixer or a butterfly mixer, thereafter kneading the mixture using heated 3-roll mill and pulverizing the kneaded mixer using a hammer mill or a cutter mill, adding to this powdery pigment—the low molecular weight polyalkylene mixture an antistatic agent and sufficiently blending the resultant mixture using a drum blender.

When the so obtained coloring agent compositions of the present invention are mixed with one another to obtain the desired color, they can be easily made into a uniform mixture without forming crude particles of each color powder. When the composition is mixed with resin pellets, it does not separate from the pellets and the pellets can be uniformly colored with good efficiency.

The colored pellets of the present invention may be very simply obtained by mixing the so obtained powdery coloring agent with resin pellets at 50–110° C. for 10 seconds to 1 minute in a Henschel mixer or a super mixer. The using ratio of the resin pellets to the powdery coloring agent is 100 parts to 0.05–10 parts, preferably up to about 5 parts. When the using ratio of the powdery coloring agent is too large, wettability of colored pellets becomes too large or uniform adhering to the pellets is obstructed.

The process for coloring a resin of the present invention does not necessitate repeated heating and melting of a resin to be colored. Accordingly, deterioration of the resin to be colored can be prevented and the pigments can be dispersed to a very high degree. The process is therefore very convenient for coloring various shapable resins.

The present invention will be specifically explained below with reference to examples.

EXAMPLE 1

Sixty parts of titanium white, 30 parts of AC Polyethylene 615 (manufactured by Allied Chemical Corporation of U.S.A., molecular weight: 5,000) and 10 parts of cadmium stearate were kneaded to make flakes that were pulverized into 100 mesh. Next, with this powder 3 parts of polyoxyethylene sorbitan monooleate were sufficiently mixed to obtain a white powdery coloring agent composition (hereinafter referred to as 1–A).

Separately, using the same amount of iron oxide instead of said titanium white similarly a brown powdery coloring agent composition (hereinafter referred to as 1–B) was obtained.

Said 1–A was mixed with said 1–B at weight ratios of 99.9:0.1, 99.5:0.5 and 99.0:1.0 and the mixtures were blended in a drum blender for 5 minutes.

On the other hand, for the purpose of comparison, titanium white, AC Polyethylene 615 and cadmium stearate were mixed at a ratio same as mentioned above to obtain a similar composition for comparison (hereinafter referred to as 1–A'). Similarly, from iron oxide, AC Polyethylene 615 and cadmium stearate, a composition for comparison (hereinafter referred to as 1–B') was prepared.

Next, 1–A' and 1–B' were blended same as mentioned above.

When from light brown powdery coloring agent compositions obtained from 1–A and 1–B and from the similar coloring agent compositions obtained from 1–A' and 1–B', 10 each samples of the same amounts were taken and numbers of particles of 1–B particles and 1–B' particles contained in each sample were counted, the results as shown in FIG. 1 and FIG. 2 were obtained. As will be apparent from the graphs, in the compositions obtained by blending the coloring agent compositions 1–A and 1–B, frequency distribution of 1–B particles is uniform and as compared with the compositions for comparison, the coloring agent compositions of the present invention are very uniformly mixed.

EXAMPLES 2–8

Instead of polyoxyethylene sorbitan monooleate in Example 1, the following antistatic agents were used and coloring agent compositions obtained same as in Example 1 showed almost the same mixed state as those of the coloring agent compositions obtained in Example 1.

| Example | Antistatic agent |
| --- | --- |
| 2 | $C_9H_{19}\text{--}\langle\text{phenyl}\rangle\text{--}O(CH_2CH_2O)_4SO_3Na$ |
| 3 | $C_{12}H_{25}O(CH_2CH_2O)_4SO_3NH(C_2H_4OH)_3$ |
| 4 | $(C_{12}H_{25}O(C_2H_4O))_2P(=O)ONa$ |
| 5 | $C_9H_{19}\text{--}\langle\text{phenyl}\rangle\text{--}O(C_2H_4O)_{12}H$ |
| 6 | $C_{12}H_{25}N((C_2H_4O)_4H)_2$ |
| 7 | $(C_{16}H_{33})_2N(CH_3)_2\cdot Cl$ |
| 8 | $C_{17}H_{35}C(=N\text{--}CH_2)(N\text{--}CH_2\text{--}CH_3COOH)(C_2H_4OH)$ |

EXAMPLE 9

From 50 parts of phthalocyamine blue, 50 parts of Sun Wax 161P (polyethylene manufactured by Sanyo Kasei Kogyo Kabushiki Kaisha, molecular weight:5,000) and 4 parts of a methanol solution of polyoxyethylenestearylamide (3:1), same as in Example 1, a blue powdery coloring agent composition (2–A) was obtained.

Separately, from 60 parts of cadmium yellow, 60 parts of Sun Wax 161P and 4 parts of a methanol solution of polyoxyethylenestearylamide, similarly a yellow powdery coloring agent composition (2–B) was prepared, and with 100 parts of this composition, 1 part of said 2–A was blended.

On the other hand, for the purpose of comparison, except not using a methanol solution of polyoxyethylenestearylamide by composition same as mentioned above, a composition 2–A' and a composition 2–B' both for comparison were prepared and with 100 parts of 2–B', 1 part of 2–A' was blended.

From two places each of a green powdery coloring agent composition obtained from 2–A and 2–B and a similar coloring agent composition obtained from 2–A' and 2–B', one part of a sample each was taken (these samples wer made 2–AB–1, 2–AB–2 and 2–A'B'–1, 2–A'B'–2). Each of these samples was added to 10 parts of 2 mm. square polypropylene pellet and mixed in a super mixer for about 10 minutes. Each of the obtained mixtures was subjected to a 20-ounce injection molding machine to mold it into a flate plate.

When the color tones of the so obtained flat plates were compared, between a flat plate obtained by using the sample 2–AB–1 and a flat plate obtained by using the sample 2–AB–2, difference of color tones was hardly recognized, whereas between a flat plate from the sample 2–A'B'–1 and a flat plate from the sample 2–A'B'–2, a great difference in color tone was recognized.

EXAMPLE 10

From 50 parts of Watchung Red, 48 parts of Epolen (polyethylene manufactured by Eastman Kodak Co. of U.S.A., molecular weight:2,500), 2 parts of 4,4'-thiobis-(3-methyl-6-t-butylphenol) (antioxidant) and 6 parts of isooctyl-2,2'-bis(-p-hydroxyphenyl) propane phosphite, same as in Example 1, a red powdery coloring agent composition (3–A) was obtained. Next, from 10 parts of carbon black, 88 parts of Epolen (N10), 2 parts of said antioxidant and 6 parts of isooctyl-2,2'-bis(-p-hydroxyphenyl) propane phosphite, similarly a coloring agent composition (3–B) was obtained.

It is possible to uniformly mix the so obtained 3–A with 3–B at any ratio. On the other hand, for the purpose of comparison, except making the amount of isooctyl-2,2'-bis(p-hydroxyphenyl) propane phosphite 10 parts, same as mentioned above coloring agent composition 3–A' and 3–B' were prepared. When it was tried to uniformly mix 3–A' with 3–B', each became a lump, and it was not possible to obtain a uniform mixture.

EXAMPLE 11

Sixty parts of iron oxide, 30 parts of AC Polyethylene 615 (manufactured by Allied Chemical Corporation of U.S.A.) and 10 parts of cadmium stearate were kneaded into flakes, that were pulverized into 100 mesh. Next, with this powder 3 parts of polyoxyethylenesorbitan monooleate were sufficiently mixed to obtain a brown powdery coloring agent. A super mixer was heated to 50° C. in which 100 parts of polyethylene resin pellets were supplied, while rotating the mixer when the temperature of the pellets became 90° C., 1 part of said powdery coloring agent was added, and when stirring was continued for 30 seconds, the surfaces of the resin pellets were covered by a uniform color film.

When the so obtained colored pellets were used in forming a flat plate, a colored flat plate in which a pigment was uniformly dispersed was obtained.

On the other hand, to 100 parts of pellets of polyethylene resin a wet pigment consisting of 0.6 part of iron oxide and 0.8 part of xylene was added and when the mixture was blended for 10 minutes within a super mixer, pellets to those surfaces the pigment adhered were obtained, however, a part of the pigment did not adhere to the pellets and existed in a free state. Using this pellets, when a flat plate same as mentioned above was molded, the coloring concentration was small as compared with what used the pellets obtained according to the process of the present invention.

EXAMPLE 12

From 50 parts of phthalocyanine blue, 50 parts of Sun Wax (polyethylene manufactured by Sanyo Kasei Kogyo Kabushiki Kaish, molecular weight: 5,000) and 4 parts of a methanol solution of polyoxyethylenestearylamide (3:1), same as in Example 11, a blue powdery coloring agent was obtained. A Henschel mixer was heated to 40° C., into which 100 parts of pellets of polypropylene resin were supplied. While rotating the mixer, when the temperature of the pellets became 60° C., 0.5 part of said powdery coloring agent was added and by continuing stirring for 1 minute, colored pellets having a uniform colored film on their surfaces was obtained.

When the so obtained colored pellets were mixed with uncolored pellets of a polypropylene resin and the mixture was melt spun, uniformly colored polypropylene fiber was obtained, which fiber was exactly same as fiber obtained by mixing concentrated colored pellets obtained by melting phthalocyanine blue with polypropylene in advance with uncolored pellets of polypropylene resin and spinning the mixture.

What is claimed is:

1. A process for the production of pellets of polyalkylene resin covered and colored with a coloring agent which consists essentially of (1) mixing and kneading a pigment with a polyalkylene resin selected from the group consisting of polyethylene, propylene and polybutene, the molecular weight being from about 1,000 to about 15,000, the weight ratio of said pigment to said polyalkylene resin being 10–230:100; (2) pulverizing the kneaded mixture to form a powdery mixture; (3) mixing uniformly with said powdery mixture an antistatic agent used for plastics, said antistatic agent being in an amount of 0.1–6% by weight based on the weight of said powdery mixture to thereby obtain a powdery coloring agent and (4) mixing said powder coloring agent with pellets of a polyalkylene resin, without melting said resin, at the weight ratio of 0.05–10:100 whereby said powdery coloring agent adheres uniformly to the surfaces of said pellets.

References Cited

UNITED STATES PATENTS

| 3,447,883 | 6/1969 | Boyer et al. | 117—138.8 E |
| 3,376,250 | 2/1968 | Newland | 260—41 |
| 3,189,574 | 7/1965 | Rogers | 260—31.8 |
| 2,772,982 | 4/1956 | Vesce | 106—272 |
| 2,512,459 | 6/1950 | Hamilton | 260—28.5 A |
| 2,993,234 | 7/1961 | Miora et al. | 117—100 R |

OTHER REFERENCES

GAF Stat., "Internal Antistatic Agents for Plastics," Aug. 12, 1965.

THEODORE MORRIS, Primary Examiner

U.S. Cl. X.R.

106—272; 117—16, 100 C, 138.8 E; 260—28.5